(12) United States Patent
Laustsen et al.

(10) Patent No.: US 9,856,648 B2
(45) Date of Patent: Jan. 2, 2018

(54) CONSTRUCTION AND A METHOD OF MAKING A CONSTRUCTION

(71) Applicant: CCL INTERNATIONAL LTD., Leeds (GB)

(72) Inventors: Esben Laustsen, Valby (DK); Bjarne Landgrebe, Holte (DK)

(73) Assignee: CCL INTERNATIONAL LTD., Leeds (GB)

( * ) Notice: Subject to any disclaimer, the term of this patent is extended or adjusted under 35 U.S.C. 154(b) by 0 days.

(21) Appl. No.: 15/105,886

(22) PCT Filed: Dec. 19, 2014

(86) PCT No.: PCT/EP2014/078666
§ 371 (c)(1),
(2) Date: Jun. 17, 2016

(87) PCT Pub. No.: WO2015/091915
PCT Pub. Date: Jun. 25, 2015

(65) Prior Publication Data
US 2016/0312469 A1    Oct. 27, 2016

(30) Foreign Application Priority Data
Dec. 20, 2013 (DK) .................. 2013 70814

(51) Int. Cl.
*E04C 5/10*     (2006.01)
*F16L 9/08*     (2006.01)
(Continued)

(52) U.S. Cl.
CPC .................. *E04C 5/10* (2013.01); *E04C 5/08* (2013.01); *E04C 5/162* (2013.01); *F16L 9/08* (2013.01)

(58) Field of Classification Search
CPC .... E04C 5/10; E04C 5/162; E04C 5/08; F16L 9/08
See application file for complete search history.

(56) References Cited

U.S. PATENT DOCUMENTS 1,881,913 A * 10/1932 Howard Parker ...... F16L 39/00
                                                          138/111
3,370,870 A *  2/1968 Mahoff ................. F16L 13/141
                                                          285/233
(Continued)

FOREIGN PATENT DOCUMENTS

AU          53792/69         10/1970
CH     EP-0521822 A1 *  1/1993  ............... E04C 5/10
(Continued)

OTHER PUBLICATIONS

International Search Report and Written Opinion for International Application No. PCT/EP2014/078666 dated Apr. 7, 2015.
(Continued)

*Primary Examiner* — Jeanette E Chapman
(74) *Attorney, Agent, or Firm* — Alston & Bird LLP

(57) ABSTRACT

The present invention provides a construction (1) comprising a first element (2) extending between a first (3) and a second (4) opposite free end and comprising a first duct (5) forming an opening (6,7) in each of the first and second free ends. The construction further comprises a second element (8) extending between a third (9) and a fourth (10) opposite free end and comprising a second duct (11) forming an opening (12,13) in each of the third and fourth free ends. The first (2) and second (8) elements are arranged so that the second end (4) and the third end (9) are facing each other. Furthermore, the construction comprises a tubular link (14) with a body of a flexible material, which the tubular link is arranged to provide communication between the first (5) and
(Continued)

second (11) ducts, thereby providing an uninterrupted duct from the first end to the fourth end.

18 Claims, 3 Drawing Sheets

(51) Int. Cl.
*E04C 5/08* (2006.01)
*E04C 5/16* (2006.01)

(56) References Cited

U.S. PATENT DOCUMENTS

| | | | | |
|---|---|---|---|---|
| 3,574,356 A * | 4/1971 | Salerno | ............ | H02G 9/06 138/111 |
| 3,606,395 A * | 9/1971 | Salerno | ............ | F16L 39/00 174/96 |
| 3,711,127 A * | 1/1973 | Raffa | ............ | F16L 37/56 285/123.1 |
| 3,774,944 A * | 11/1973 | Slaton | ............ | F16L 39/00 285/124.5 |
| 3,820,572 A * | 6/1974 | Keyser | ............ | F16L 1/028 138/105 |
| 3,873,134 A * | 3/1975 | Sammaritano | ............ | F16L 39/00 285/123.2 |
| 5,332,269 A * | 7/1994 | Homm | ............ | B25L 327/10 285/249 |
| 5,421,623 A * | 6/1995 | Cassin | ............ | F16L 21/00 285/343 |
| 5,762,380 A * | 6/1998 | Hiwatashi | ............ | F16L 21/08 285/322 |
| 6,241,291 B1 * | 6/2001 | Hui-Chen | ............ | F16L 19/075 285/249 |
| 6,773,039 B2 * | 8/2004 | Muenster | ............ | F16L 37/138 285/242 |
| 7,267,375 B1 * | 9/2007 | Sorkin | ............ | E04C 5/10 285/245 |
| 7,695,021 B1 * | 4/2010 | Sorkin | ............ | E04C 5/10 285/226 |
| 2010/0088985 A1 | 4/2010 | Mellier et al. | | |

FOREIGN PATENT DOCUMENTS

| | | | | |
|---|---|---|---|---|
| DE | EP-0348870 A1 * | 1/1990 | ............ | E04C 5/10 |
| JP | 407 166 650 A | 6/1995 | | |
| JP | 2002 030610 A | 1/2002 | | |
| WO | WO 2006/099900 A | 9/2006 | | |

OTHER PUBLICATIONS

International Preliminary Report on Patentability (Chapter II) for International Application No. PCT/EP2014/078666 dated May 30, 2016.

* cited by examiner

CONSTRUCTION AND A METHOD OF MAKING A CONSTRUCTION

CROSS-REFERENCE TO RELATED APPLICATIONS

This application is a national stage application filed under 35 U.S.C. 371 of International Application No. PCT/EP2014/078666, filed Dec. 19, 2014, which claims priority from DK PA 2013 70814, filed Dec. 20, 2013, each of which is incorporated by reference herein in its entirety.

FIELD OF THE INVENTION

The present invention relates to a construction such as a building, a bridge, a road, or a wall etc., comprising at least two elements, each element comprising at least one through-going duct. The invention further relates to a method of making a construction by assembling at least two elements.

BACKGROUND OF THE INVENTION

Precast concrete elements for constructions, bridges, roads, harbours, and other construction work are increasingly used in modern construction work. Traditionally, constructions comprising at least two elements are constructed by arranging the two elements adjacently, or on top of each other. The elements are joined by use of concrete. To form the concrete into a desired shape, and to keep the concrete in place until the setting of the concrete is complete, a formwork is made.

The formwork is made on location and due to difficult accessibility or large tolerances etc., the formwork seldom match exactly to the shape of the precast concrete elements which are to be joined. Typically the concrete therefore escapes the formwork and leaks to unwanted positions. This introduces an increased consumption of concrete and may potentially cause large expenses for removing concrete which has escaped the formwork.

DESCRIPTION OF THE INVENTION

It is an object of embodiments of the invention to provide an improved construction and an improved method of making a construction.

It is a further object of embodiments of the invention to provide a joint between elements where leakage of joint material can be reduced or even avoided.

According to a first aspect, the invention provides a construction comprising:
  a first element extending between a first and a second opposite free end and comprising a first duct forming an opening in each of the first and second free ends;
  a second element extending between a third and a fourth opposite free end and comprising a second duct forming an opening in each of the third and fourth free ends;
  wherein the first and second elements are arranged so that the second end and the third end are facing each other; and
  wherein the construction further comprises a tubular link with a body of a flexible material, the tubular link being arranged to provide communication between the first and second ducts and to provide an uninterrupted duct from the first end to the fourth end.

Due to the tubular link and the flexible material, the two ducts may be connected in a cost efficient manner, and by forming an uninterrupted duct from the first end to the fourth end, formwork becomes unnecessary. Particularly, not only the first and second elements, but also the tubular link can be made entirely prefabricated, and ad hoc, on location formwork becomes unnecessary.

It should however be understood, that other formwork may still be necessary.

In the context of the present invention, the term "duct" should be understood as, a tubular element, such as a tube, being elongated and having an opening at each end. The duct may have a substantially circular cross-section. However, ducts having another cross-section, such as an oval cross-section, are also covered by the term "duct". The duct may be made in one piece, or may be made from a plurality of duct elements which may be joined by overlapping sections, may be butt joined, or may be otherwise joined.

When arranging the tubular link to provide communication between the first and second ducts, and thereby provide an uninterrupted duct, a substantially liquid tight duct may be formed through the first and second elements. Dependent on the material used and dependent on the connection between the tubular link and the first and second ducts, the uninterrupted duct may also be substantially airtight.

The first and second elements may be used for several types of constructions, such as walls, decks, foundations, bridges, ramps, tunnels, etc. The elements may be precast, or in-situ cast.

The first and second elements may be arranged vertically above each other e.g. when constructing a wall, a ramp, a tunnel, and the like, or alternatively horizontally next to each other e.g. when constructing a deck or a bridge, or constructing a wall, thereby resulting in either vertically positioned or horizontally positioned ducts. It should however be understood, that at least one of the elements may also be positioned with an inclination, such as at an angle of e.g. 5, 10, or 15 degrees, or any other degree, thereby providing at least one inclined duct.

In one embodiment, the first element may be arranged vertically, whereas the second element positioned on top of this first element may be arranged at an angle relative to the first element, whereby the first and second ducts are angled relative to each other, thereby forming an uninterrupted duct having at least one break, i.e. an uninterrupted duct which is not linear.

When positioning the first and second elements above or below each other, e.g. to form a wall, the lower opening in the upper duct, i.e. the duct opening facing downwards towards the element positioned below, may be arranged in a recess in the upper free end of the lower element. When positioning two elements next to each other, a recess may likewise be formed in at least one of these.

It should be understood, that when positioning the first and second elements above or below each other, a recess can be either in the upper free end of the lower element, or, in the lower free end of the upper element.

The first and second elements are arranged so that the second end faces the third end. The distance between the two ends may depend on the construction to be provided, the size of the construction, the size of the elements, the size of the ducts, and other parameters. It should however be understood, that the invention is equally applicable for constructions in which the second end faces the fourth end and in which the first end faces the third end.

When arranging the first and second elements so that a free end of each are facing each other, the first and second ducts are arranged to provide communication there between via the tubular link. This may be achieved by aligning the ducts. By "aligned" is herein meant, that the opening in the first element is at least partly overlapping the opening in the second element when viewed in parallel to the element. However, communication may also be achieved when the first duct and the second duct are not aligned. In the latter case, the flexibility of the tubular link may ensure communication between the first and second ducts thereby providing an uninterrupted duct from the first end to the fourth end.

In the context of the present invention, the term "body of a flexible material" should be understood as a body having a shape which is easily reshaped during intended handling thereby allowing easy and quick reshaping to adapt the body to a first duct and a second duct not being aligned, or being arranged so that the openings partly overlap. It could e.g. be a flex hose.

The first and second elements may be precast concrete elements. The first and second ducts may be metal ducts which are cast into the elements at the precast plant. The ducts may be made from sheet metal having a plane surface or alternatively a corrugated surface. The latter may improve the ability of the concrete to stick to the ducts thereby facilitating the adherence of the concrete. It should however be understood, that the ducts may also be made of polymer material having a smooth or corrugated surface, or another material suitable for being cast into or otherwise arranged in the first and second elements.

The first and second elements may comprise one duct each. It should however be understood, that at least one of the elements may comprise a plurality of ducts.

The diameter of the ducts may depend on the construction to be provided, the size of the construction, the size of the elements, etc. The ducts may be provided with equal diameter. However, in an alternative embodiment the diameter of the first duct may be different from the diameter of the second duct. In the latter embodiment, the diameter of the tubular link may be substantially equal to the diameter of the first duct at one end of the link, whereas the diameter of the tubular link may be substantially equal to the diameter of the second duct at the other end of the tubular link.

The cross-sectional shape of the ducts and the link may be substantially circular. It should however, be understood that the shape may alternatively be oval or in other ways form a shape being different from circular.

As the tubular link comprises a body of a flexible material, the cross-sectional shape of this body may change along the length of the body, e.g. be due to a pressure on the body during positioning of the tubular link.

The construction may further comprise a third element extending between a fifth and a sixth opposite free end and comprising a third duct forming an opening in each of the fifth and sixth free ends. The third element may be arranged so that the fifth end is facing the fourth end. A second tubular link may be arranged to provide communication between the third duct and one of the first and second ducts, to thereby provide an uninterrupted duct from the first end to the sixth end.

It should be understood that the order of the three elements may be chosen differently, as the third element as an example may be positioned between the first and second elements or next to or above/below the first element instead of next to or above/below the second element. Furthermore, the construction may comprise more elements, such as four, five, six, or even more elements arranged next to each other, or above or below each other.

To facilitate arrangement of the tubular link relative to the first and second elements, the link may further comprise at least one non-flexible transition part attachable to one end of the body and forming a socket to be received in one of the ducts. The link may comprise two non-flexible transition parts, each being attachable to an end of the body to provide a link comprising two non-flexible transition parts with a flexible body there between.

The non-flexible transition part(s) may be formed of metal, such as steel, and may have a substantially circular cross-section with a diameter being less than the diameter of the duct(s) to facilitate insertion of the transition part into the duct. Other materials, such as polymer material, may also be used.

In the context of the present invention, the term "non-flexible transition part" should be understood as a part having a shape which is maintained during intended handling. I.e. it is not intended to be deformed during use.

It should be understood, that the construction may also be made without the two non-flexible transition parts by arranging the tubular link with a body of a flexible material without the non-flexible parts to thereby provide an uninterrupted duct without the non-flexible transition parts. This may be done by arranging each of the opposites ends of the body inside the first and second ducts, respectively, or by extending each of the first and second ducts so that they protrude from the first and second elements, respectively and attaching the tubular link with the flexible body to these protrusions.

The link which is arranged to provide communication between the first and second ducts may be positioned solely by inserting the non-flexible transition part(s) into the duct(s) or by inserting the flexible body itself into the duct(s). In one embodiment, the link may however comprise a locking structure for locking of the link to at least one of the ducts. The locking structure may e.g. be an O-ring of a flexible material adapted to ensure fixing of the link to the duct.

Alternatively, the link and the duct may be clamped together e.g. by use of a hose clamp. This may be especially suitable, if the duct is provided so that an end of the duct is protruding the free end of the element. In a further alternative, the link may be bonded to the first and/or second duct by use of an adhesive. Other locking structures, such as a treaded structure, may also be applied.

The non-flexible transition part(s) may likewise be adhered to the body, or may be attached by use of a hose clamp or an O-ring. It should however be understood, that other ways of attachment of non-flexible part may also be applicable. In one embodiment, the non-flexible transition part may be detachable attached to the body thereby providing a possibility of subsequently separating the part from the body, if required.

At least one of the elements may be provided with an elongated reinforcement structure along the length of the element in order to strengthen the element. In one embodiment, an elongated reinforcement structure may extend through the link and the first and second ducts, i.e. extend through the uninterrupted duct from the first to the fourth end.

The reinforcement structure may as an example comprise at least one cable or an elongated tensile element. Alternatively, the reinforcement structure may comprise a rod. Other types of reinforcement structures may also be used. The reinforcement structure may be made from steel, or a material of similar strength.

In embodiments comprising three or even more elements, an elongated reinforcement structure may extend through each of the links and each of the ducts, whereby the reinforcement structure extends through the uninterrupted duct from one free end to the opposite free end. I.e. in a construction comprising three elements, the reinforcement structure may extend through the links and the first, second, and third ducts.

It should however be understood that the elongated reinforcement structure may comprises a plurality of reinforcement elements, such a plurality of cables running in parallel or being coiled. One or more of the reinforcement elements may extend through all the elements, whereas one or more of the other reinforcement elements may only extend through one or some of the elements.

To further strengthen the construction the reinforcement structure may be stressed after positioning hereof. Stressing of the reinforcement structure may be carried out only for one or more of a plurality of reinforcement elements, and not necessarily for each of the reinforcement elements.

To improve the strength of the elements, the uninterrupted duct may be filled with a filling material, such as injection mortar or another easily floating mortar. The filling material may be expandable. If the duct comprises a reinforcement structure, the filling material may support this reinforcement structure and ensure that the reinforcement structure is kept in place, and prevent deformation of the reinforcement structure, thus acting as a locking structure for the reinforcement structure.

It should be understood, that mortar is an example of a filling material. The filling material may be any material that can fill the voided space inside the duct.

In order to prevent bonding of the reinforcement structure to the filling material, at least a part of the elongated reinforcement structure may be located in an elongated shielding, such as an elongated tube encircling the reinforcement structure. If the construction comprises a plurality of elongated reinforcement elements, it should be understood, that one or more of these elements may be located in a shielding, and one or more may be arranged in the ducts without shielding and thus subsequently may be bonded by the filling material.

Furthermore, if the construction comprises a plurality of elongated reinforcement elements being located in a shielding, it should be understood, that these elements may each be located in a shielding. However, some of the elongated reinforcement elements may also be located in a common shielding.

If the tubular link is made from metal, the joint may further be able to take up sheer forces, thereby increasing the strength of the construction further.

Dependent on the filling material used, this material may further act as corrosion protection of the reinforcement structure, e.g. by providing an air tight barrier.

According to a second aspect, the invention provides a method of making a construction, the method comprising the steps of:
  providing a first element extending between a first and a second opposite free end and comprising a first duct forming an opening in each of the first and second free ends;
  providing a second element extending between a third and a fourth opposite free end and comprising a second duct forming an opening in each of the third and fourth free ends;
  arranging the first and second elements so that the second end and the third end are facing each other; and
  arranging a tubular link with a body of a flexible material between the first and second elements to provide communication between the first and second ducts and to provide an uninterrupted duct from the first end to the fourth end.

It should be understood, that a skilled person would readily recognise that any feature described in combination with the first aspect of the invention could also be combined with the second aspect of the invention, and vice versa.

The construction according to the first aspect of the invention is very suitable when performing the method steps according to the second aspect of the invention. The remarks set forth above in relation to the construction are therefore equally applicable in relation to the method.

To improve the strength of the construction, the method may further comprising a step of arranging a reinforcement structure so that it extends from the fourth end to the first end through the link and the first and second ducts. After arrangement of the reinforcement structure, tension may be provided in the reinforcement structure to improve the strength of the construction.

The method may comprise an additional step of filling the uninterrupted duct with a filling material. In case the uninterrupted duct is positioned vertically, the filling material may be injected through an inlet and may flow from the inlet vertically upwards to an upper end of the duct, as this may improve the possibility of removing air bubbles from the duct, and thereby ensure complete filling of the duct. Removal of air bubbles may both add to corrosion protection of the reinforcement structure and add to the improved strength of the construction, as the duct may be completely filled.

The uninterrupted duct may however, also be filed from above. In case of a horizontally positioned uninterrupted duct, an inclined duct, or a non-linear duct, the duct may likewise be filed from one of the free ends. Thus, the filling material may be injected through an inlet and may flow from the inlet substantially horizontally to an opposite end of the duct, or through the inclined duct from one end to an opposite end.

BRIEF DESCRIPTION OF THE DRAWINGS

Embodiments of the invention will now be further described with reference to the drawings, in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
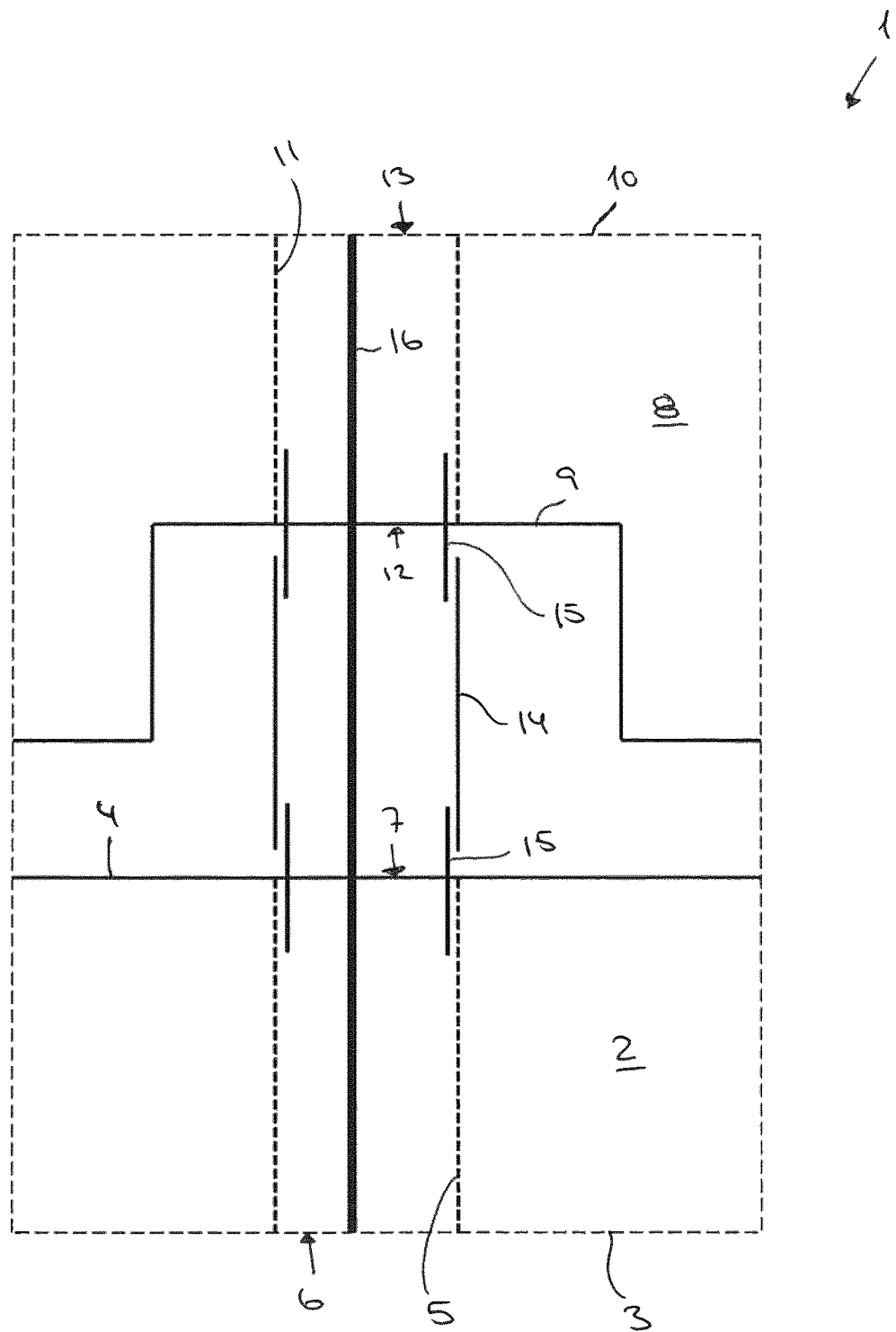
FIG. 1 illustrates a section through an embodiment of a construction comprising two elements and a tubular link.

FIG. 1 illustrates a section through an embodiment of a construction 1 comprising a first element 2 extending between a first free end 3 and a second opposite free end 4. The first element 2 comprises a first duct 5 forming an opening 6, 7 in each of the first and second free ends 3, 4. The construction 1 further comprises a second element 8 extending between a third free end 9 and a fourth opposite free end 10. The second element 8 comprises a second duct 11 forming an opening 12, 13 in each of the third and fourth free ends 9, 10.

The first and second elements 2, 8 are arranged so that the second end 4 and the third end 9 are facing each other and so that the openings 7, 12 are aligned. The first and second elements 2, 8 are positioned vertically to form e.g. a wall for a construction (a building, a ramp, a tunnel, etc.), or a part hereof. It should be understood, that the construction 1 may comprise more elements than the two elements illustrated.

The construction 1 further comprises a tubular link with a body 14 of a flexible material. The tubular link is arranged to provide communication between the first and second ducts 5, 11 thereby providing an uninterrupted duct from the first end 3 to the fourth end 10.

In the illustrated embodiment, the cross-sectional shape of the ducts 5, 11 and the link are substantially circular.

The tubular link further comprises two non-flexible transition parts 15 each being attached to opposite ends of the body 14. The non-flexible transition parts 15 each forms a socket to be received in one of the ducts 5, 11.

The non-flexible transition parts 15 have a substantially circular cross-section with a diameter being less than the diameter of the ducts 5, 11 to facilitate insertion of the transition parts into the ducts. In FIG. 1 the distance between the inner surface of the ducts and the outer surface of the non-flexible transition parts 15 is scaled up to facilitate understanding of the positioning of the link 14, 15 relative to the ducts 5, 11. Thus, the illustrated openings between the ducts and the link will not be present or at least be substantially smaller than illustrated in the figure, thereby substantially limiting or even eliminating the risk of filling material to escape and substantially limiting or even eliminating the risk of unwanted material getting into the inner of the duct.

It should be understood, that the construction 1 may also be made without the two non-flexible transition parts 15 by arranging the tubular link with a body 14 to provide communication between the first and second ducts 5, 11 without these parts 15 and thereby providing an uninterrupted duct from the first end 3 to the fourth end 10 without the non-flexible transition parts 15. This can be done by arranging each of the opposites ends of the body 14 inside the first and second ducts 5, 11, respectively, or by extending each of the first and second ducts 5, 11 so that they protrude from the first and second elements 2, 8, respectively and attaching the tubular link with the body 14 to these protrusions.

The construction 1 further comprises an elongated reinforcement structure 16 which extends through the link 14, 15 and the first and second ducts 5, 11, i.e. extends through the uninterrupted duct from the first end 3 to the fourth end 10. In the illustrated embodiment, the reinforcement structure 16 comprises at least one cable.

To improve the strength of the construction 1, the uninterrupted duct is filled with a filling material (not shown). The filling material supports the reinforcement structure 16, and ensures that the reinforcement structure 16 is kept in place. The filling material further acts as corrosion protection of the reinforcement structure 16.

Figure 2:
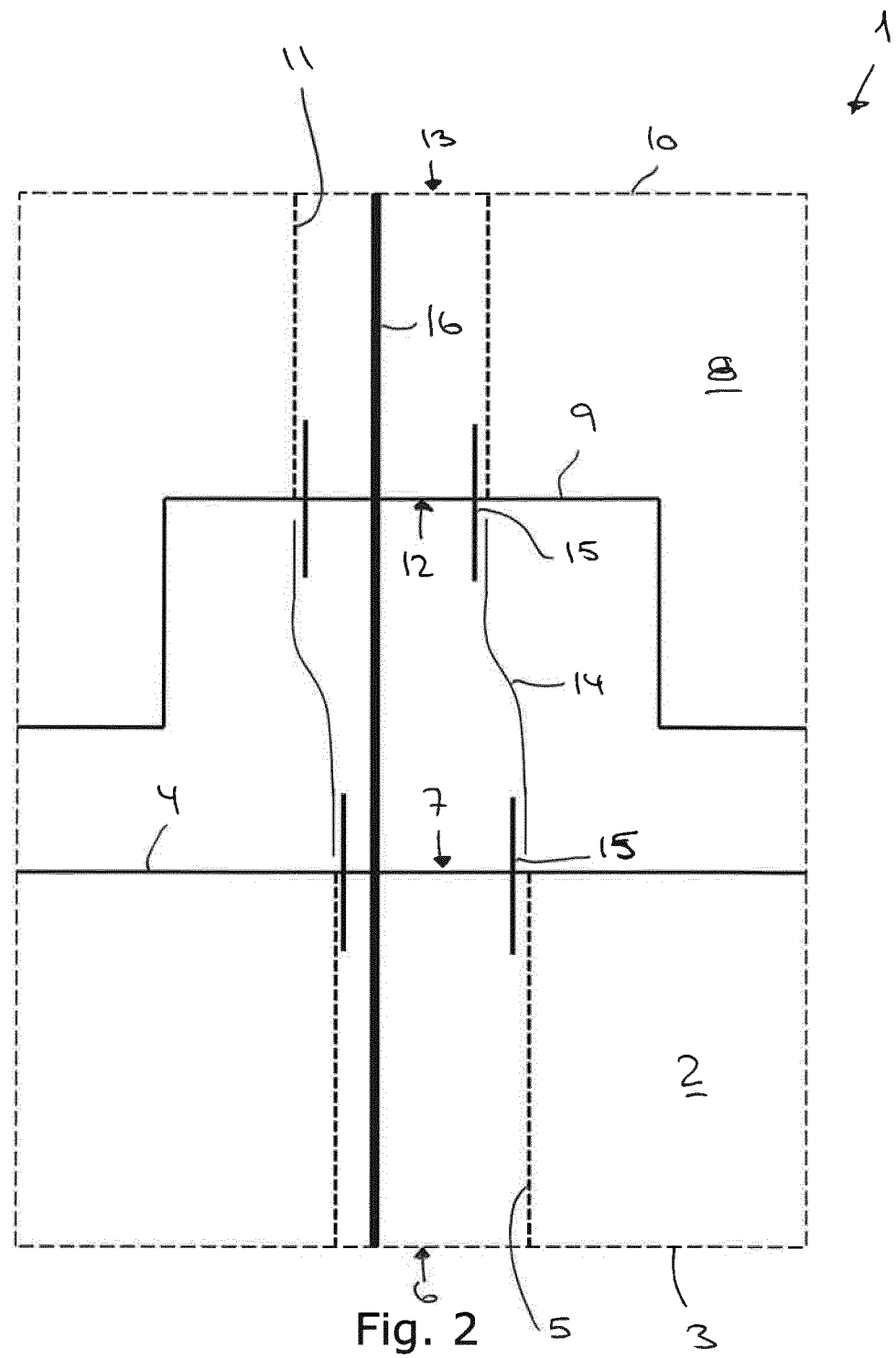
FIG. 2 illustrates a section through an alternative embodiment of a construction comprising two elements and a tubular link.

FIG. 2 illustrates a section through an alternative embodiment of a construction 1 comprising a first element 2 and a second element 8. The first element 2 comprises a first duct 5, and the second element 8 comprises a second duct 11.

The first and second elements 2, 8 are arranged so that the second end 4 and the third end 9 are facing each other. The first and second elements 2, 8 are positioned vertically to form e.g. a wall for a building, or a part hereof.

The construction 1 further comprises a tubular link with a body 14 of a flexible material. The tubular link further comprises two non-flexible transition parts 15 each being attached to opposite ends of the body 14. The tubular link 14, 15 is arranged to provide communication between the first and second ducts 5, 11 thereby providing an uninterrupted duct from the first end 3 to the fourth end 10.

The opening 7 in the first element 2 is partly overlapping the opening 12 in the second element 8. The flexibility of the body 14 of the tubular link 14, 15 provides easy and quick reshaping of the body 14 to thereby adapt the body to the first duct 5 and a second duct 11 not being fully aligned thereby ensuring communication between the first and second ducts 5, 11 to provide an uninterrupted duct from the first end 3 to the fourth end 10.

Figure 3:
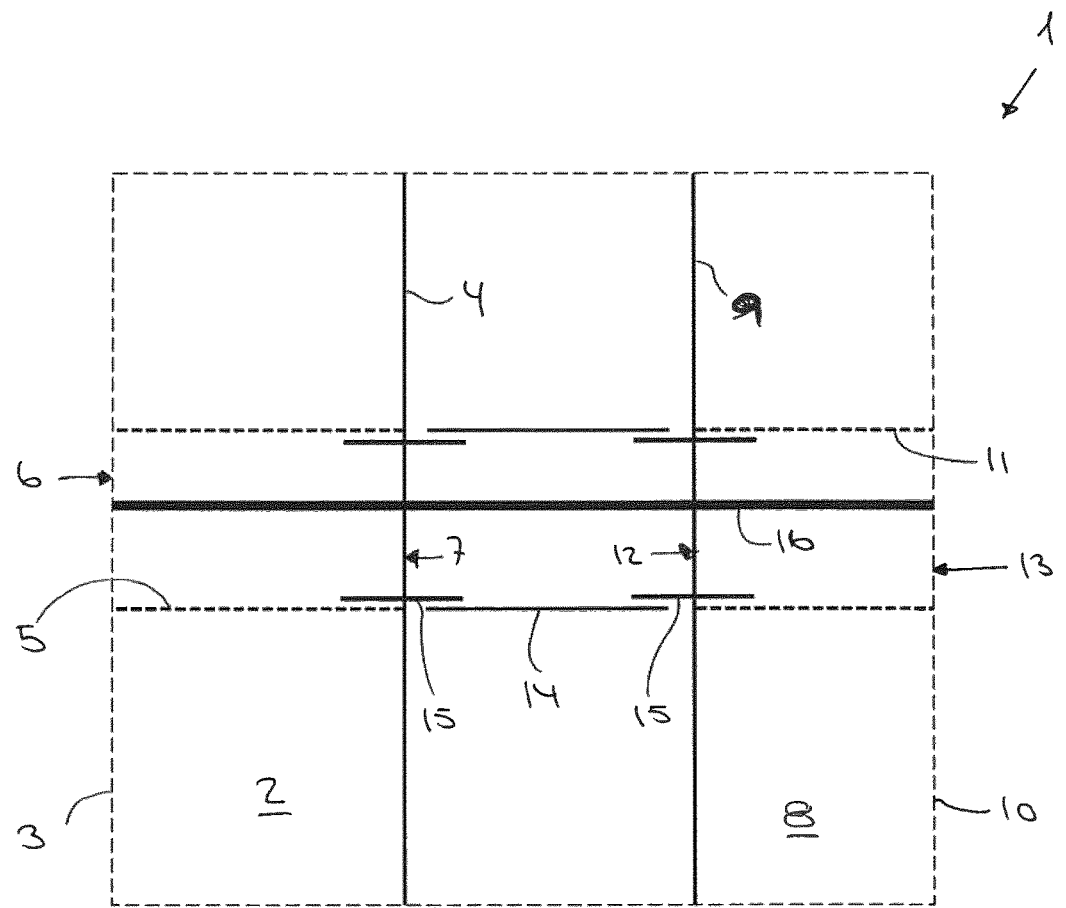
FIG. 3 illustrates a section through a further alternative embodiment of a construction comprising two elements and a tubular link.

FIG. 3 illustrates a section through an alternative embodiment of a construction 1 comprising a first element 2 and a second element 8. The first element 2 comprises a first duct 5, and the second element 8 comprises a second duct 11. The first and second elements 2, 8 are positioned horizontally to form e.g. a deck or a bridge.

The first and second elements 2, 8 are arranged so that the second end 4 and the third end 9 are facing each other and so that the openings 7, 12 are aligned.

The invention claimed is:

1. A construction comprising:
    a first element extending between a first and a second opposite free end and comprising a first duct forming an opening in each of the first and second free ends;
    a second element extending between a third and a fourth opposite free end and comprising a second duct forming an opening in each of the third and fourth free ends;
    wherein the first and second elements are arranged so that the second end and the third end are facing each other;
    wherein the first and second ducts protrude from the first and second element; and
    wherein the construction further comprises a tubular link with a body of a flexible material to allow reshaping to adapt the body to a first duct and a second duct not being aligned, the tubular link being arranged to provide communication between the first and second ducts and providing an uninterrupted duct from the first end to the fourth end.

2. A construction according to claim 1, wherein the link further comprises at least one non-flexible transition part attachable to one end of the body and forming a socket to be received in one of the ducts.

3. A construction according to claim 1, wherein the link further comprises a locking structure for locking of the link to at least one of the ducts.

4. A construction according to claim 1, further comprising an elongated reinforcement structure extending through the link and the first and second ducts.

5. A construction according to claim 1, further comprising a third element extending between a fifth and a sixth opposite free end and comprising a third duct forming an opening in each of the fifth and sixth free ends; wherein the third element is arranged so that the fifth end is facing the fourth end; and wherein a second tubular link is arranged to provide communication between the third duct and one of the first and second ducts, to thereby provide an uninterrupted duct from the first end to the sixth end.

6. A construction according to claim 5, wherein the reinforcement structure extends through the links and the first, second, and third ducts.

7. A construction according to claim 4, wherein the reinforcement structure comprises at least one cable.

8. A construction according to claim 4, wherein the reinforcement structure is stressed to strengthen the construction.

9. A construction according to claim 1, wherein the uninterrupted duct is filled with a filling material.

10. A construction according to claim 4, wherein at least a part of the elongated reinforcement structure is located in an elongated shielding.

11. A method of making a construction, the method comprising the steps of:
- providing a first element extending between a first and a second opposite free end and comprising a first duct forming an opening in each of the first and second free ends, the first duct protruding from the first element;
- providing a second element extending between a third and a fourth opposite free end and comprising a second duct forming an opening in each of the third and fourth free ends, the second duct protruding from the second element;
- arranging the first and second elements so that the second end and the third end are facing each other; and
- arranging a tubular link with a body of a flexible material between the first and second elements to provide communication between the first and second ducts and to provide an uninterrupted duct from the first end to the fourth end, the flexible material allowing adaptation of the body to a first duct and a second duct not being aligned.

12. A method according to claim 11, further comprising a step of arranging a reinforcement structure so that it extends from the fourth end to the first end through the link and the first and second ducts.

13. A method according to claim 11, further comprising a step of filling the uninterrupted duct with a filling material.

14. A method according to claim 13, wherein the filling material is injected through an inlet and flows from the inlet vertically upwards to an upper end of the duct.

15. A method according to claim 13, wherein the filling material is injected through an inlet and flows from the inlet horizontally to an opposite end of the duct.

16. A construction according to claim 5, wherein the reinforcement structure comprises at least one cable.

17. A construction according to claim 5, wherein the reinforcement structure is stressed to strengthen the construction.

18. A construction according to claim 5, wherein at least a part of the elongated reinforcement structure is located in an elongated shielding.

* * * * *